United States Patent
Gröning

(12) 
(10) Patent No.: US 12,465,896 B2
(45) Date of Patent: Nov. 11, 2025

(54) CARBONATION APPARATUS, AND METHOD FOR THE INTRODUCTION OF GAS TO LIQUID

(71) Applicant: Aquis Systems AG, Rebstein (CH)

(72) Inventor: Ingolf Gröning, Bad Mergentheim (DE)

(73) Assignee: Aquis Systems AG, Rebstein (CH)

(*) Notice: Subject to any disclaimer, the term of this patent is extended or adjusted under 35 U.S.C. 154(b) by 239 days.

(21) Appl. No.: 18/125,421

(22) Filed: Mar. 23, 2023

(65) Prior Publication Data

US 2023/0302418 A1 Sep. 28, 2023

(30) Foreign Application Priority Data

Mar. 28, 2022 (DE) .................... 102022107275.4

(51) Int. Cl.
| | |
|---|---|
| B01F 23/23 | (2022.01) |
| A23L 2/54 | (2006.01) |
| B01F 23/236 | (2022.01) |
| B01F 23/2361 | (2022.01) |
| B01F 35/21 | (2022.01) |
| B01F 101/14 | (2022.01) |

(52) U.S. Cl.
CPC ............ B01F 23/2363 (2022.01); A23L 2/54 (2013.01); B01F 23/2319 (2022.01); B01F 23/236 (2022.01); B01F 23/23611 (2022.01); B01F 23/2364 (2022.01); B01F 35/2112 (2022.01); B01F 35/2116 (2022.01); B01F 35/2117 (2022.01); B01F 2101/14 (2022.01)

(58) Field of Classification Search
CPC ........................ B01F 23/236; B01F 23/2363
See application file for complete search history.

(56) References Cited

U.S. PATENT DOCUMENTS

2019/0291062 A1 9/2019 Wood et al.

FOREIGN PATENT DOCUMENTS

| DE | 20101093 U1 | 5/2002 | |
|---|---|---|---|
| DE | 202015005848 U1 | 9/2016 | |
| DE | 102020215036 A1 | 6/2021 | |
| JP | 2011212128 A | * 10/2011 | |
| JP | 5980375 B2 | * 8/2016 | ........... B67D 1/0054 |

OTHER PUBLICATIONS

Search Report dated Dec. 19, 2022 for corresponding application DE102022107275.4.

* cited by examiner

Primary Examiner — Robert A Hopkins
(74) Attorney, Agent, or Firm — Bachman & LaPointe, P.C.

(57) ABSTRACT

The invention relates to a carbonation apparatus (10), in particular for the introduction of carbon dioxide to liquid, having a gas outlet which is configured to be introduced into a container (7) which can be filled with liquid, a gas connector which is fluidically connected to the gas outlet via a controllable valve (4), a control device (5) which is configured to control the valve (4), comprising, furthermore: a fixture (1) with a weight determining device for determining a weight of a gas cylinder (3) which is received in the fixture (1) and is connected to the gas connector.

18 Claims, 2 Drawing Sheets

CARBONATION APPARATUS, AND METHOD FOR THE INTRODUCTION OF GAS TO LIQUID

BACKGROUND OF THE INVENTION

The invention relates to a carbonation apparatus for the introduction of gas to liquid, and to a method for the introduction of gas to liquid.

Carbonators are known from the prior art which are used in domestic usage to introduce carbon dioxide or carbonic acid to water, in order to produce sparkling water, that is to say water with carbonic acid added.

DE 10 2020 215 036 A1 has disclosed what is known as a fully automatic carbonator which is intended to produce a defined degree of carbonation by means of different sensors or measuring devices. An automated setting of a pre-settable degree of carbonation is understood to mean that the fully automatic machine automatically produces a preset degree of carbonation, which can also be a degree of carbonation selected by the user, in the drinking water of the water container.

There is a requirement, however, for a pre-settable degree of carbonation to be provided by way of simplified technical means or using fewer sensors.

SUMMARY OF THE INVENTION

It is an object of the invention to solve the problems from the prior art, at least partially. In particular, it is an object of the invention to specify an improved carbonation apparatus and method, by way of which, in particular, a pre-settable degree of carbonation can be produced by way of simplified technical means or with the use of fewer sensors.

The object is achieved by way of a carbonation apparatus as disclosed herein and a method as disclosed herein. Advantageous developments and embodiments result from the subclaims and from this description.

One aspect of the present disclosure relates to a carbonation apparatus, in particular for the introduction of carbon dioxide to liquid, comprising: a gas outlet which is configured to be introduced into a container which can be filled with liquid, a gas connector which is fluidically connected to the gas outlet via a controllable valve, a control device which is configured to control the valve, wherein the carbonation apparatus comprises, furthermore: a fixture with a weight determining device for determining a weight of a gas cylinder which is received in the fixture and is connected to the gas connector.

A further aspect of the present invention relates to a method for the introduction of gas to liquid with the use of a typical carbonation apparatus, as described herein, comprising: introducing of the gas outlet into a container which is filled at least partially with a liquid; determining of a weight of a gas cylinder which is received in the fixture and is connected to the gas connector; and actuating of the valve which is arranged in a fluidic connection from the gas connector to the gas outlet, by way of the control device in a manner which is dependent on the determined weight of the gas cylinder.

Herein, the term "gas cylinder" is preferably understood to mean any container suitable for receiving $CO_2$, for example also containers which are not configured in a classic cylinder shape, or else containers which can receive more than 0.25 liter or more than 1.0 liter of gas.

The fixture typically comprises a holder for the gas cylinder. In the case of preferred embodiments, the fixture comprises a weight determining device in the form of a force sensor or a scale, by way of which the weight of the gas cylinder can be determined. The fixture is preferably arranged in such a way, for example in a housing or a space for the gas cylinder, that the gas cylinder is freely suspended on the fixture after the insertion into the fixture. In the case of embodiments, the fixture has a holder which clasps the gas cylinder at a neck or which holds the gas cylinder on a holder provided for this purpose, for example an eyelet or a rail. In different embodiments, the fixture is advantageously of pivotable configuration, in order to make a simple exchange of the gas cylinder possible.

In the case of typical embodiments, the control device is configured to calculate a degree of filling of the gas cylinder from the weight of the gas cylinder. In particular, the control device is configured to determine a volumetric flow of gas, which flows through the valve during opening of the valve, from the weight of the gas cylinder. To this end, for example, a look-up table can be stored in the control device. Furthermore, in the case of preferred embodiments, the control device can be configured to detect a type of the gas cylinder on the basis of an optical code arranged on the gas cylinder or on the basis of a near field communication code arranged on the gas cylinder such as, for example, an RFID chip, and to determine a degree of filling of the gas cylinder from the weight of the gas cylinder on the basis of a look-up table.

In the case of typical embodiments, the control device actuates the valve in a manner which is dependent on the determined weight of the gas cylinder. This affords the advantage that a relatively low filling level of the gas cylinder can be extrapolated, for example, in the case of a relatively low weight of the gas cylinder. In the case of a relatively low filling level, the valve is opened for a shorter time than in the case of a high filling level, in order to achieve a predefined degree of carbonation.

In the case of typical embodiments, the control valve actuates the valve in a manner which is dependent on a degree of carbonation which can be set by a user. In the case of typical methods, the control device receives an input of a degree of carbonation, for example from a user, and actuates the valve additionally in a manner which is dependent on the degree of carbonation set by the user. In the case of typical embodiments, the valve is opened in a manner which is dependent on the determined weight and the input of the degree of carbonation, the dependency influencing, in particular, the duration of the opening of the valve. In the case of valves with a controllable opening width, a degree of opening of the valve can also be influenced.

In the case of typical carbonation apparatuses, the control device is configured to detect a container volume of a container which is connected to the gas outlet or to detect a liquid volume of a liquid which is received in the container, and to actuate the valve in a manner which is dependent on the detected container volume or the detected liquid volume. Typical methods of embodiments detect a container volume of a container which is connected to the gas outlet or a liquid volume, and actuate the valve additionally in a manner which is dependent on the detected container volume or the detected liquid volume. In the case of typical embodiments, in particular, the container volume and the liquid volume are detected, and the valve is actuated in a manner which is dependent on the two volumes. In the case of typical embodiments, a degree of filling of the container can also be derived from the variables of container volume and liquid volume, and an actuation of the valve can take place in a manner which is dependent on the degree of filling. Further embodiments proceed from a predefined degree of filling or a predefined liquid volume for certain containers. It is a further possibility to estimate a liquid volume from the container volume, for example by means of a predefined percentage which denotes the ratio of the liquid volume to the container volume.

In the case of embodiments, it is typically possible for the container volume of the container or the liquid volume of a liquid in the container to be detected for the control device by way of input on an operating element of the control device. The input on the operating element can take place haptically, for example on a handle, on a rotary sleeve or on a button, or acoustically, for example with the aid of a voice command computer which is connected to the operating element, for example, via the Internet. A further input possibility of embodiments is visual detection, for example of a gesture of a user.

In the case of typical embodiments, the control device comprises a sensor for detecting the container volume of the container and/or the liquid volume of a liquid in the container. The at least one sensor can comprise an optical sensor which detects the container optically using its design or a code, for example a barcode or QR code on the container. Furthermore, there can be an electromagnetic near field communication sensor such as, for example, an RFID sensor, which can communicate with an RFID chip which is arranged on or in the container. The liquid volume of the liquid in the container can be detected, for example, by way of an optical sensor, for example a laser, or an ultrasonic sensor which measures a time of flight of noise to the liquid surface, in order to detect the liquid volume.

In the case of typical embodiments, the control device is configured to specify a filling level value, determined in a manner which is dependent on the weight of the gas cylinder, for the filling level of the gas cylinder. To this end, in the case of typical methods of the invention, determining of a filling level value can take place in a manner which is dependent on the weight of the gas cylinder, and outputting of the filling level value can take place, for example, via a display or via a color indicator. In the case of embodiments, the filling level value can be converted into an estimated remaining number of carbonation operations which can be output to a user. Typical embodiments can be distinguished by the fact that the filling level value or the remaining number of carbonation operations is transmitted to a server or to a mobile device.

In the case of embodiments of methods and control devices, it can be provided that an operating frequency is determined, and a notification with a purchase suggestion is output to a user or reordering is triggered in an automated manner in a manner which is dependent on an operating frequency, the average $CO_2$ consumption during a carbonation operation and the filling level value or the weight of the gas cylinder. If it is determined, for example, that the carbonation apparatus is used an average of X times per day or a maximum of Y times per day, the notification for purchasing or for ordering a new gas cylinder is triggered, with the result that at least 5 times X or 5 times Y average carbonation operations are still possible. In this example, reordering or a purchase would be triggered five days before an expected depletion of the $CO_2$ reservoir of the gas cylinder. For subscriptions or service agreements, in particular, this is an advantageous function, for example for enabling a door-to-door service to supply a new gas cylinder in time.

In the case of typical embodiments of carbonation apparatuses, the control device varies the opening time of the valve in a manner which is dependent on a parameter. Possible parameters within the context of the invention are, in particular, the determined weight of the gas cylinder, the degree of carbonation which can be set, the container volume of the container, or the liquid volume of a liquid in the container. As is otherwise customary in the case of an absence of any other specification, the preceding parameter list also includes a combination of the stated parameters or parameters which are derived from the parameters such as, for example, a remaining number of carbonation operations or a remaining $CO_2$ quantity, which are derived in each case from the weight of the gas cylinder.

The carbonation apparatus is typically configured as a constituent part of a conditionable water system. A conditionable water system typically has a control apparatus, and can have an encoding element, it being possible for the control apparatus to store control data relating to a code of the encoding element. Typical conditionable water systems can comprise at least one or a plurality of the following components: filter, cooler, carbonation apparatus in one of the typical embodiments described herein, boiler and mixer for mixing different waters. Filter 13 and cooler 15 are schematically illustrated in FIG. 1 described below. One example of the function of a mixer can be providing water at a defined temperature with mixing of hot and cold water.

In the case of typical embodiments, the control data comprise information relating to at least one of the following conditioning operations of the dispensed water: addition of carbonic acid, quantity or temperature. Thus, for example, information relating to a setpoint temperature of the water in ° C. or ° F. can be included in the control data. Typical temperatures can include from, for example, just above 0° C., for example 4° C., as far as boiling or substantially 100° C. Furthermore, information relating to an addition of carbonic acid can be included in the control data, for example a setpoint degree of carbonation of the water to be dispensed.

The control device is typically connected to a digital network interface, for example a USB, Bluetooth, LAN or WLAN interface. Typical control devices are configured to provide information such as, for example, the parameters mentioned herein via the digital interface. Preferred embodiments provide access to the control device via a server which is connected to the digital interface. It is thus possible to access the control device, for example, by way of a terminal which is, in particular, mobile. As a result, a representation of the information can take place or else a reminder can be output if a filling level or a mass of the gas cylinder undershoots a previously defined limit, in particular a limit which can be defined by way of a user. In this way, timely reordering by way of the user or in an automated manner as possible.

Typical embodiments enable the multiple production of sparkling beverages with a consistent degree of carbonation in the case of a different degree of filling of the gas cylinder which is filled with carbon dioxide.

BRIEF DESCRIPTION OF THE DRAWINGS

In the following text, the present invention will be explained in greater detail on the basis of the appended drawings, the figures being described as follows.

DETAILED DESCRIPTION

In the following text, typical embodiments of the invention will be described on the basis of the figures; the invention is not restricted to the exemplary embodiments, but rather the scope of the invention is defined by way of the claims. In the case of the description of the embodiment, identical designations are used in some circumstances for identical or similar parts in different figures and for different embodiments, in order to make the description clearer. This does not mean, however, that corresponding parts of the invention are restricted to the variants which are shown in the embodiments.

Figure 1:
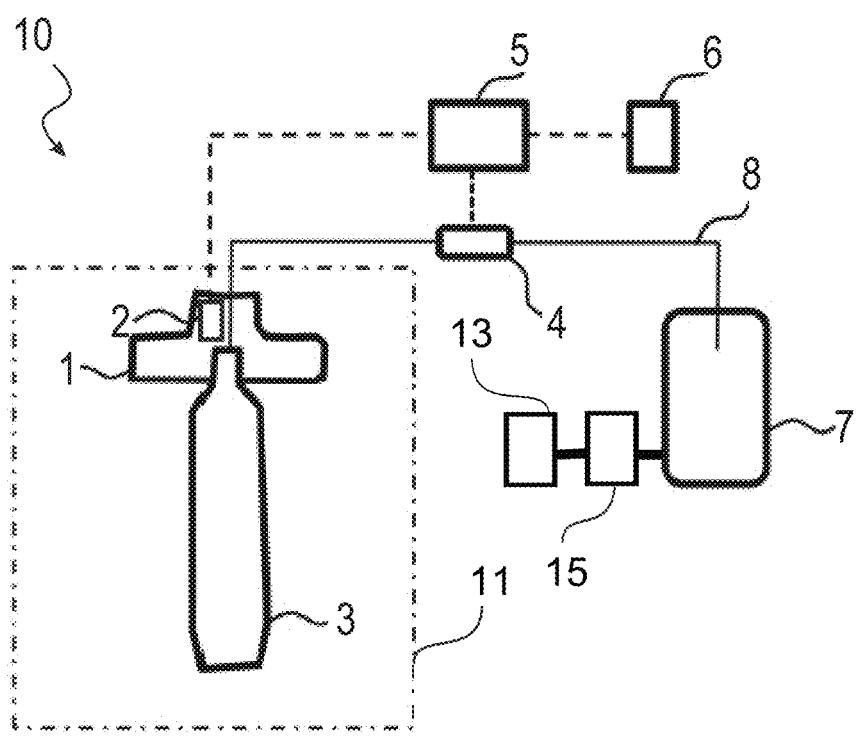
FIG. 1 shows a diagrammatic illustration of a carbonation apparatus in accordance with one exemplary embodiment.

FIG. 1 shows one exemplary embodiment of a carbonation apparatus 10 in accordance with one exemplary embodiment. A gas cylinder 3 is received in a fixture 1. The gas cylinder 3 is suspended freely in a gas cylinder space 9 which can be, for example, a base cabinet of a kitchen unit or a dedicated housing 11 of the carbonation apparatus.

A control device 5 determines a mass of the gas cylinder 3 by way of a force sensor 2 which is connected to the fixture 1. A connection to the force sensor can be established, for example, wirelessly or via an electrically conductive medium.

A degree of carbonation which is set by a user is transmitted via an operating element 6 to the control device 5, it being possible for the transmission to take place wirelessly or via an electrically conductive medium. In the case of further embodiments, the carbonation apparatus comprises a digital interface, for example for receiving a degree of carbonation, or the control device comprises a memory, in which a degree of carbonation for a code which can be received via a sensor is stored. The sensor can be, for example, a near field communication sensor such as, for example, an RFID sensor, or an optical sensor, for example for capturing QR codes.

The controller 5 determines a predefined time duration for which the valve 4 is to be opened from the mass of the gas cylinder, which has been detected with the aid of the force sensor 2, and the degree of carbonation, with the result that the degree of carbonation is achieved in a liquid in a container 7 upon feeding of gas from the gas cylinder 3. Here, the control device 5 also takes into consideration a container volume of the container 7, a degree of filling of the container 7 with liquid, for example water, or a liquid volume of a liquid which is received in the container 7.

After the time duration is determined, the control device 5 actuates the valve for the time duration, with the result that the open valve allows gas to flow from the gas cylinder 3 via a pressure line 8 into the container. In this way, gas is added to the liquid in the container 7, for example water, via the pressure line 8.

Figure 2:
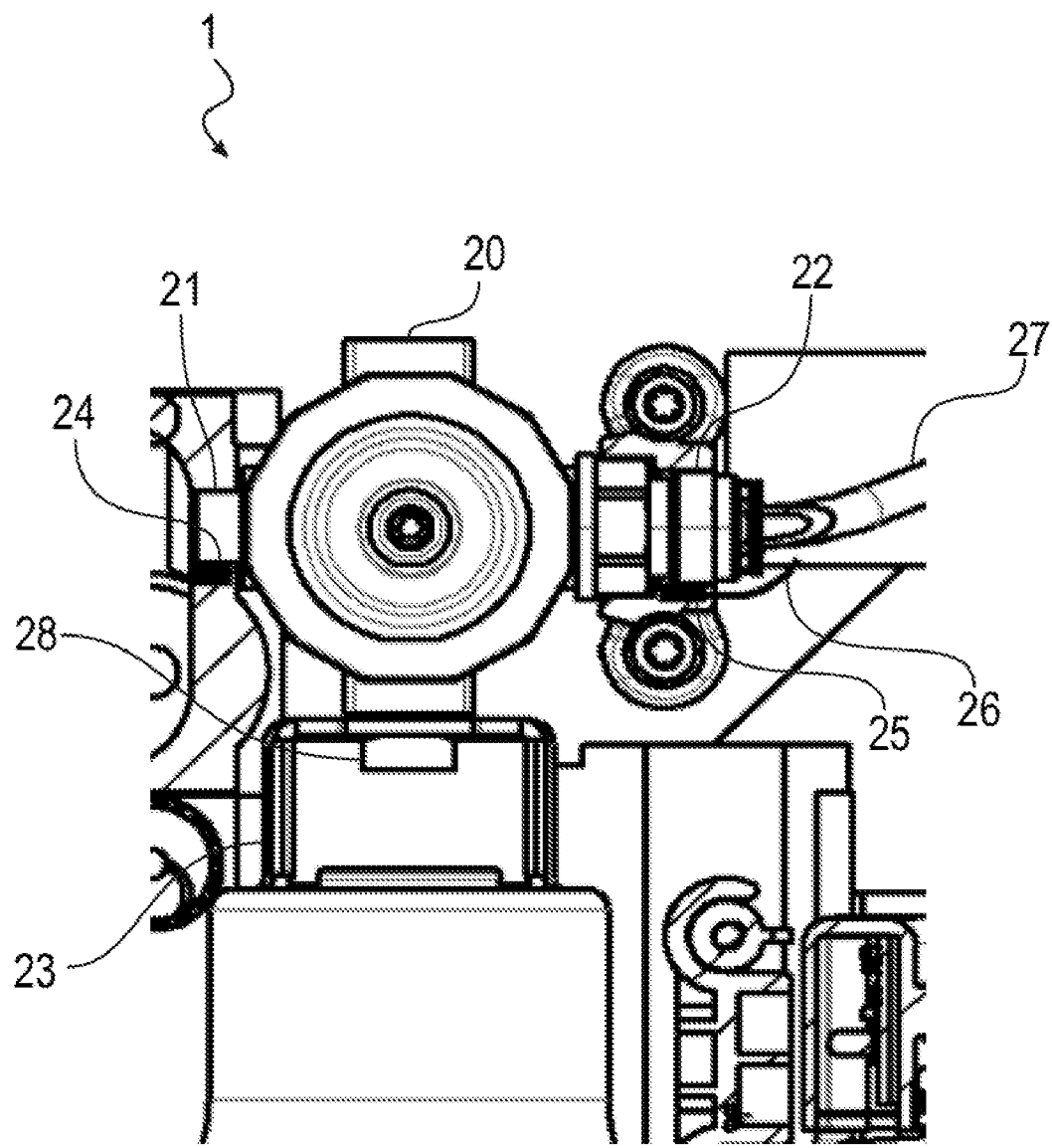
FIG. 2 shows a detail of a diagrammatic sectional drawing of a fixture of a carbonation apparatus in accordance with one exemplary embodiment.

FIG. 2 shows a diagrammatic, partially shown sectional view of elements of a typical fixture of embodiments. A gas cylinder (not shown in FIG. 2) can be held in a holder 20. To this end, the holder 20 has a thread in a region 23 of the holder 20, into which thread the upper end piece of a gas cylinder can be screwed. A gas connector 28 is provided at the upper end of the region 23 of the holder 20, which gas connector 28 can receive gas from a gas cylinder which is screwed into the thread. The gas cylinder can be screwed into the thread from below, with the result that it is ensured that only the gaseous phase escapes and not the liquid phase of the $CO_2$.

In the case of further embodiments, bayonet fittings or other fasteners can also be provided.

In order to facilitate a swap of the gas cylinder in the holder 20, the holder 20 can be pivoted about a rotational axis. To this end, the holder is mounted by way of a left-hand first bearing journal 21 and a right-hand second bearing journal 22 in corresponding recesses of a housing part or in a bearing part which is provided for this purpose. The bearing journals 21 and 22 enable pivoting of the gas cylinder forward in order to facilitate the swap of the gas cylinder.

A leadthrough for gas which is received via the gas connector 28 from a gas cylinder which is received in a holder 20 is integrated into the second bearing journal 22. The gas is conducted further through a line 27 further to a valve (reference numeral 4 in FIG. 1).

A first load cell 24 is arranged on the right and a second load cell 25 is arranged on the left in each case in a stationary region below the bearing journals in respective recesses of the housing part or the bearing part of the holder. An electrical connector 26 is also shown relating to the second load cell in FIG. 2. The electrical connector of the first load cell 24 is concealed in the sectional view of FIG. 2. A movement of the electrical connectors 26 of the load cells 24 and 25 is avoided by way of the arrangement of the load cells 24 and 25 in stationary regions.

The bearing journals 21 and 22 in each case always press on the corresponding load cell 24 and 25. Therefore, the load cells 24 and 25 measure the weight of the holder 20 if the gas cylinder is not inserted, and measure the weight of the holder 20, the gas cylinder (empty) and the $CO_2$ in the gas cylinder if the gas cylinder is inserted.

In the case of typical embodiments, the respective weight of the gas cylinder is defined clearly in each case for certain sizes of the gas cylinder and is stored, for example, in a look-up table. In the case of embodiments, it can be ensured via the holder, for example by way of certain threads, or by way of an RFID communication, that only clearly defined gas cylinders, for example, can be used with certain defined connectors. As a result, it can be ensured that the weight of the gas cylinder is also known to the control apparatus. In addition or as an alternative, the safety can be provided via an optional RFID communication between an RFID chip of the gas cylinder and the control device.

The invention is not restricted to the above-described embodiments; rather, the scope of the invention is defined by way of the appended claims.

LIST OF REFERENCE NUMERALS

1 Fixture
2 Force sensor
3 Gas cylinder
4 Valve
5 Control device
6 Operating element
7 Container
8 Pressure line
9 Gas cylinder space
10 Carbonation apparatus
20 Holder
21 First bearing journal
22 Second bearing journal
23 Region for receiving the gas cylinder 24 First load cell
25 Second load cell
26 Electrical connector
27 Line
28 Gas connector

The invention claimed is:

1. A sparkling beverage conditioned water system comprising a carbonation apparatus (10) for the introduction of carbon dioxide to liquid, the carbonation apparatus (10) comprising:
   a gas outlet which is configured to be introduced into a container (7) which can be filled with liquid,
   a gas connector which is fluidically connected to the gas outlet via a controllable valve (4),
   a control device (5) which is configured to control the valve (4),
   a fixture (1) with a weight determining device for determining a weight of a gas cylinder (3) which is received in the fixture (1) and is connected to the gas connector, the control device (5) actuating the valve (4) in a manner which is dependent on the determined weight of the gas cylinder (3), and
   a housing defining an interior space, wherein the gas cylinder (3) is within the interior space.

2. The sparkling beverage conditioned water system according to claim 1, the control device (5) actuating the valve (4) in a manner which is dependent on a degree of carbonation which can be set by a user.

3. The sparkling beverage conditioned water system according to claim 1, the control device (5) being configured to detect a container volume of a container which is connected to the gas outlet, and to actuate the valve (4) in a manner which is dependent on the detected container volume.

4. The sparkling beverage conditioned water system according to claim 3, wherein the container volume of the container and/or a liquid volume of a liquid in the container (7) can be detected for the control device (5) by way of input on an operating element (6) of the control device (5).

5. The sparkling beverage conditioned water system according to claim 3, the control device (5) comprising a sensor for detecting the container volume of the container and/or a liquid volume of a liquid in the container (7).

6. The sparkling beverage conditioned water system according to claim 4, the control device (5) being configured to specify a filling level value, determined in a manner which is dependent on the weight of the gas cylinder, for the filling level of the gas cylinder.

7. The sparkling beverage conditioned water system according to claim 1, the control device (5) varying the opening time of the valve (4) in a manner which is dependent on a parameter.

8. The sparkling beverage conditioned water system according to claim 1, the carbonation apparatus (10) being of integral configuration with a conditionable water system.

9. The sparkling beverage conditioned water system according to claim 1, the fixture (1) comprising a holder (20) which can be pivoted about a rotational axis by means of two bearing journals (21, 22), two load cells (24, 25) being provided in each case below the bearing journals (21, 22) as part of the weight determining device.

10. A method for the introduction of gas to liquid with the use of the sparkling beverage conditioned water system according to claim 1, the method comprising:
   introducing of the gas outlet into a container (7) which is filled at least partially with a liquid;
   determining of a weight of a gas cylinder (3) which is received in the fixture (1) and is connected to the gas connector; and
   actuating of the valve (4) which is arranged in a fluidic connection from the gas connector to the gas outlet, by way of the control device (5) in a manner which is dependent on the determined weight of the gas cylinder (3).

11. The method according to claim 10, further comprising:
   receiving of an input of a degree of carbonation; and
   actuating of the valve (4) additionally in a manner which is dependent on the degree of carbonation which is set by the user.

12. The method according to claim 10, further comprising:
   detecting of a container volume of a container which is connected to the gas outlet; and
   actuating of the valve (4) additionally in a manner which is dependent on the detected container volume.

13. The method according to claim 10, further comprising:
   detecting of a liquid volume of a liquid which is situated in the container (7); and
   actuating of the valve (4) additionally in a manner which is dependent on the detected liquid volume.

14. The method according to claim 10, further comprising determining of a filling level value in a manner which is dependent on the weight of the gas cylinder (3), and outputting of the filling level value.

15. The sparkling beverage conditioned water system of claim 1, further comprising a cooler for cooling liquid in the container (7).

16. The sparkling beverage conditioned water system of claim 1, further comprising a filter for filtering liquid entering the container (7).

17. The sparkling beverage conditioned water system according to claim 1, wherein the fixture is configured to freely suspend the gas cylinder (3) within the interior space.

18. A sparkling beverage conditioned water system comprising a carbonation apparatus (10) for the introduction of carbon dioxide to liquid, the carbonation apparatus (10) comprising:
   a gas outlet which is configured to be introduced into a container (7) which can be filled with liquid,
   a gas connector which is fluidically connected to the gas outlet via a controllable valve (4),
   a control device (5) which is configured to control the valve (4), and
   a fixture (1) with a weight determining device for determining a weight of a gas cylinder (3) which is received in the fixture (1) and is connected to the gas connector, the control device (5) actuating the valve (4) in a manner which is dependent on the determined weight of the gas cylinder (3), wherein the fixture (1) is configured to freely suspend the gas cylinder (3).

* * * * *